Aug. 26, 1969    E. P. SMITH    3,463,287
AUTOMATIC INFLATION SYSTEM FOR EVACUATION SLIDE
Filed April 8, 1968    2 Sheets-Sheet 1
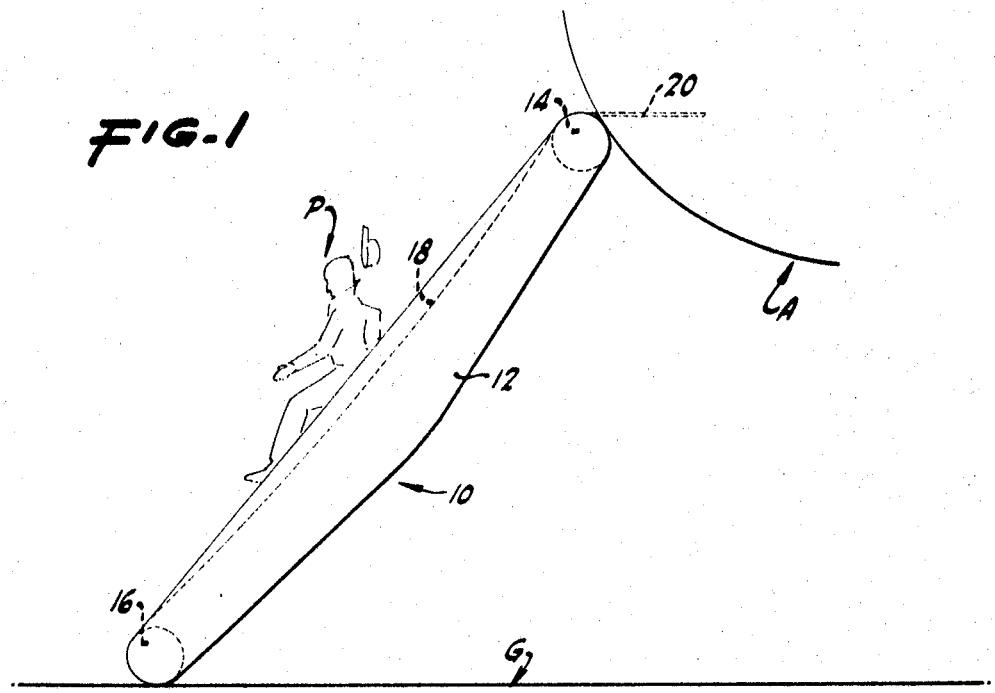
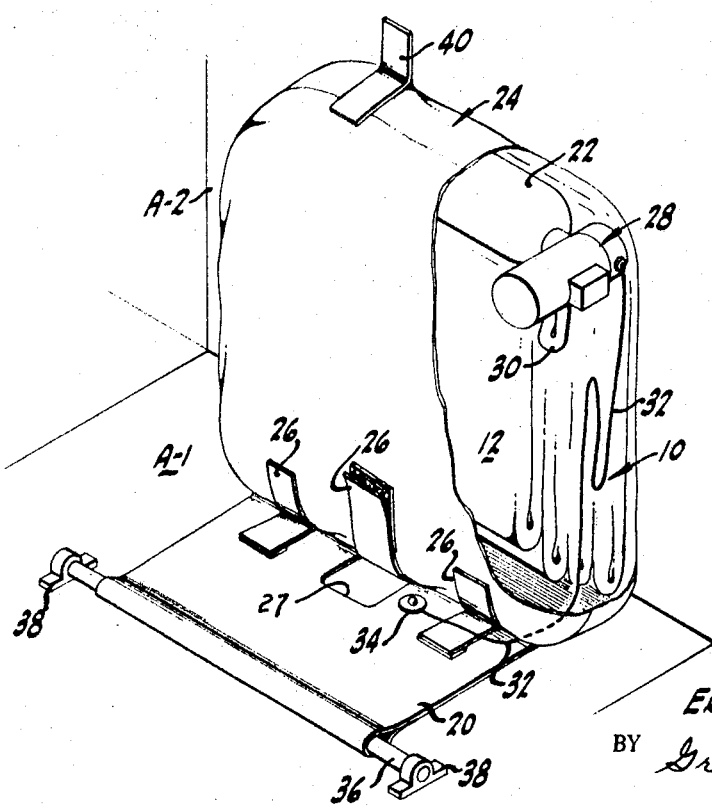
INVENTOR.
ERIC P. SMITH
BY Gregg & Stidham
ATTORNEYS

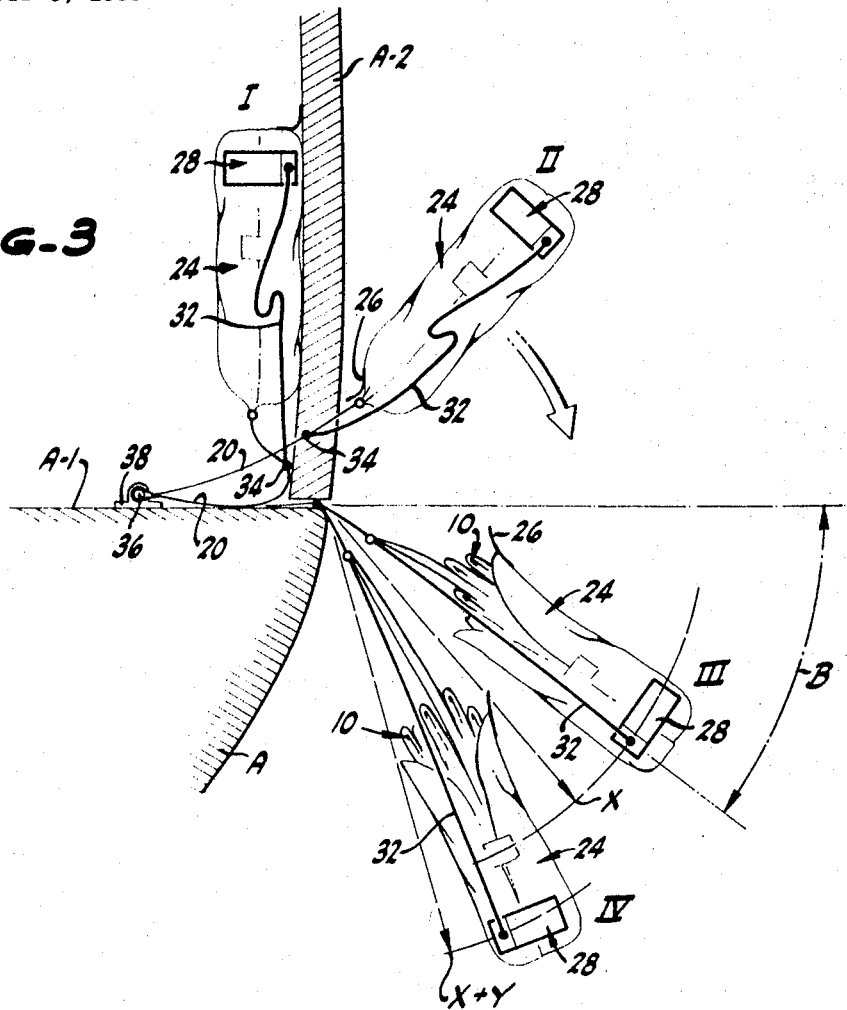
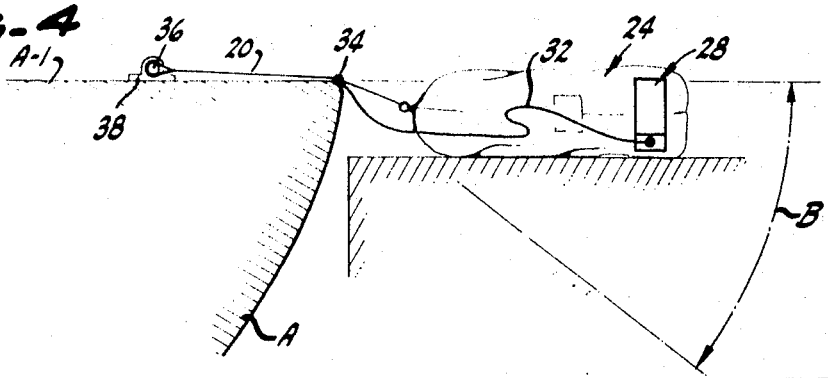

United States Patent Office 3,463,287
Patented Aug. 26, 1969

3,463,287
AUTOMATIC INFLATION SYSTEM FOR
EVACUATION SLIDE
Eric P. Smith, San Francisco, Calif., assignor to Industrial
Covers, Inc., San Francisco, Calif., a corporation of
California
Filed Apr. 8, 1968, Ser. No. 719,400
Int. Cl. B65g *11/10;* A62b *1/20*
U.S. Cl. 193—2.5                                    6 Claims

ABSTRACT OF THE DISCLOSURE

Automatic inflation system for evacuation slide including a valve connected to a source of pressure fluid for inflation of longitudinal beam. The valve is operated by a cable which is anchored to the aircraft so that when the slide is dropped from the aircraft, the weight of the slide or inflation means to which the valve is secured opens the valve and inflates the beam automatically. The cable may be set to operate the valve at the earliest possible moment but not until it reaches a predetermined level below the floor of the aircraft to insure that it is not accidentally triggered by a short drop as, for example, an inadvertent drop onto a passenger loading platform.

DESCRIPTION OF THE INVENTION

This invention relates to an aircraft evacuation slide, and more particularly, to an evacuation slide with an inflation system which is actuated automatically upon ejection of the folded slide from the aircraft.

In the event of forced landings or emergencies away from the airport terminal building, the attendant dangers of fuel ignition and the like deem it highly important that the passengers be evacuated as quickly as possible. This is conveniently accomplished by means of escape slides which are carried on the aircraft and such slides may take the form of a flexible sheet member extended across inflatable, distensible tubular members which, when inflated, function as load-carrying structural beams. Such structures are highly desirable for aircraft use in that they may be folded and packed into a compact mass and stowed in readily accessible disposition adjacent the aircraft escape exit.

When emergency conditions require, the slide pack is normally released from its storage compartment and after it is dropped from the aircraft emergency exit a cabin attendant operates a suitable inflation triggering apparatus to actuate a valve of the like and initiate inflation. Such manual operation of the triggering device requires the attendant to wait until the slide pack is properly deployed outside the aircraft and then stoop or reach for the triggering device to actuate it. Obviously, the desirability of avoiding even a fractional second delay in valve operation deems it highly advantageous to trigger the inflation apparatus concurrently with the ejection of the slide from the aircraft.

It is, therefore, an object of this invention to provide an automatic inflation device that is triggered automatically during the movement of the packed evacuation slide after being ejected from the aircraft.

It is a further object of this invention to provide an evacuation slide inflation system which is triggered automatically only after the slide has dropped a sufficient distance below the level of the aircraft floor to insure that it will not be triggered in response to accidental dropping of the stowed slide pack.

It is a further object of this invention to provide an evacuation slide inflation system which is operated in response to ejection of the packed slide from the aircraft at a predetermined point in its path of travel.

In carrying out this invention, there is provided an inflatable aircraft evacuation slide which is normally stowed in folded, packed disposition on or adjacent to the door of the aircraft with the upper end of the slide firmly secured to the aircraft fuselage. Preferably, the slide pack is releasably mounted on the door with the top of the slide firmly secured to the floor so that the pack pulls free to drop from the aircraft when the door is opened. The inflation system comprises a source of pressure fluid, such as bottled gas which is connected through a valve to the inflatable beams of the slide. The valve is operated by movement of a suitable tension member, such as a cable with the end of the cable being firmly anchored at a fixed anchor point on the aircraft. When the evacuation slide is in normal, stowed disposition, the valve is carried on the slide pack close enough to the fixed anchor point that the cable is relaxed. However, when it falls with the slide, it moves through a distance sufficient to tighten the cable and then operate the valve. The length of the cable is selected so that the valve will not operate prematurely and initiate inflation if the slide is accidentally dropped onto the aircraft floor or on to a passenger loading dock wherein the evacuation slide is not required, but should be short enough that inflation is initiated as early as possible in the fall of the packed slide once the safe level has been reached.

Other objects and advantages of this invention will become apparent from the description following when read in conjunction with the accompanying drawings wherein:

FIG. 1 is a side elevation view of an evacuation slide in use;

FIG. 2 is an isometric view showing an evacuation slide as stowed aboard an aircraft;

FIG. 3 is a more or less schematic view showing the sequence of operation of the automatic inflation assembly; and FIG. 4 is a schematic illustration of a built-in safety feature preventing premature inflation.

Referring now to the drawings with greater particularity, there is shown in FIG. 1 an escape slide 10 including two or more longitudinal inflatable beams 12 and top and bottom inflatable bearing members 14 and 16 which, together, carry a flexible sheet 18 which functions as a slide surface for evacuation of a passenger P from an aircraft A to the ground level G. The slide is firmly anchored at its upper end to the aircraft by any suitable means, such as a strap or girt 20 of substantial tensile strength hereinafter to be described further. The upper cross-bearing member 14 bears against the side of the aircraft A when inflated to support the slide against lateral deflection by wind forces or the like. In addition, when inflated it tends to dispose the escape slide normal to the surface of the aircraft fuselage A whereby the desired slope of the slide 10 is achieved naturally.

Referring now to FIG. 2, the escape slide 10 is shown in its stowed disposition folded into a compact mass and packed together with a source of pressure fluid, such as a gas bottle 22, in a valise 24. The valise 24 may be closed releasably as by means of releasable traction straps 26, one of which extends from back to front through an opening 27 in the girt 24. The gas bottle is connected through a valve device 28 and suitable conduit means 30 to one or more of the inflatable members 12, 14. The valve 28 can be of any conventional type or construction and it is not intended that the invention be limited in this regard. It is merely necessary that it be opened by pulling a suitable tension member such as a small cable 32 through a predetermined increment of movement. The other end of the cable is fixed to the aircraft by suitable anchoring means which, for example, could include a patch 34 bonding the end of the cable to the surface of the girt 20. The girt 20 is, in turn, anchored to the aircraft A as by fixing an anchor bar 36 in suitable brackets 38 secured to the aircraft floor A–1. Hence, the valve 28 may be opened by moving the valve away from the anchor point, first to tension the cable 32 and then through a distance sufficient to open the valve. This movement is conveniently accomplished by securing the slide pack valve to the inside of the aircraft door A–2 by any releasable means such as a friction holding strap 40. Consequently, as the door is opened with the girt held by the anchor bar the slide pack 24 is pulled free of the door A–2 and drops from the aircraft A carrying the valve 28 with it. At the same time, the holding strength of the friction straps 26 closing the end of the valise 24 is low enough that it is overcome by the weight of the slide or by the pulling action of the door A–2 so that the slide 10 unfolds as it drops.

The sequence of operation is shown more clearly in FIG. 3 wherein at position I the pack is stowed on the door A–2 with the firing line from the anchor point 34 to the valve 28 slack, although the amount of slack is less than the amount of slack in the girt 20 and the slide 10 measured from the girt anchor bar 36 to the point on the slide wherein the valve 38 is attached. In position II, deployment is initiated and the amount of cable slack is reduced as is the amount of slack in the girt 20. In fact, the girt 20 is under tension from the anchor bar 36 to pull the slide pack 24 free of the door A–2 to commence its drop.

In position III, which is well below the level of the aircraft floor A–1 by a predetermined amount indicated by the angle B, the strap 26 holding the bottom of the valise closed has been released and the slide 10 commences to withdraw from the pack 24. In this position the cable is taut, though the valve 28 is still in its first or closed position. The length of the cable is represented by the arc X with anchor point 34 as its center. In position IV, a substantial portion of the slide 10 has been withdrawn from the pack 24 and the valve has moved through a distance X+Y from the anchor point 34. The distance Y represents the stroke of the cable required to open the valve 38. Hence, when the slide pack reaches position IV the valve is in open position and inflation is initiated.

While it is desirable to have the valve opened as soon as possible during the fall of the slide pack 24, it is also important to prevent inadvertent inflation every time the pack falls from the door. For example, should the stewardess or other cabin attendant neglect to release the securing bar 36 from its brackets 38, when the plane has landed safely and taxied to its loading ramp, the slide pack will, of course, be released from the door when the door is opened. If the slide were to inflate at this stage, it would not only block the passengers' route of egress, but may require a substantial delay in subsequent take-off while the slide pack was replaced.

While this invention was described in conjunction with preferred embodiments thereof, it is apparent that modifications and changes therein may be made by those skilled in the art without departing from the spirit and scope of this invention as defined by the claims appended hereto.

Having described my invention, I claim:

1. In combination with an escape slide including at least one inflatable longitudinal beam and an upper slide surface, said slide being normally deflated and folded into a compact mass and stowed on an aircraft with the upper end thereof firmly anchored to the aircraft at an exit thereof,
   an automatic inflation device comprising:
   a source of pressure fluid connected to said inflatable beam,
   a valve member including operating means movable between a first position wherein said valve means are closed and a second position wherein said valve means are open, and
   a tension member secured at one end to said operating means and at the other end to anchor means fixed on the aircraft,
   said valve member being carried on said slide when said slide is packed close enough to said anchor means that said tension member is relaxed and being conditioned to move with said slide when said slide is ejected from the aircraft a distance sufficient to move said operating means from said first position to said second position.

2. The combination defined by claim 1 wherein:
   said valve member is fixed to said slide at a point displaced from said anchor means close enough that said tension member is relaxed but which moves away from the anchor means as the slide is unfolded to place said tension member under tension and move said operating means.

3. The combination defined by claim 1 wherein:
   said valve member is fixed to a point on said slide said point being close enough to said anchor means when said slide is in normal stowed disposition that said tension member is relaxed but being adapted to move away from said anchor means when the stowed pack is ejected from the aircraft to extend said tension member to its full length plus enough to move said operating means during movement of said slide from the aircraft.

4. The combination defined by claim 1 wherein:
   the length of said tension member is selected relative to the distance between said anchor means and said operating means in its second position with tension member taut that the operating means is moved into its second position at a predetermined point in the travel of said slide from the aircraft.

5. The combination defined by claim 1 wherein:
   said tension member is sufficiently long relative to the distance between said anchor means and said operating means in its second position that the operating means is not moved from its first position until after the slide has moved a predetermined distance from its stowed position.

6. The combination defined by claim 1 including:
   a container in which said slide is stowed,
   releasable means closing the end of said container adjacent the upper end of said slide,
   the weight of said slide with valve member and pressure fluid source being sufficient to overcome said releasable means to enable slide to unfold from said container during ejection thereof.

References Cited

UNITED STATES PATENTS 2,765,131   10/1956   Boyle _____ 182—48
3,102,623    9/1963   Schacht.
3,018,867    1/1962   Heyniger.

REINALDO P. MACHADO, Primary Examiner

U.S. Cl. X.R.

182—48